United States Patent
Murphy, Jr.

[11] 3,806,721
[45] Apr. 23, 1974

[54] FLUSH MOUNTED VEHICLE LAMP

[75] Inventor: Harry S. Murphy, Jr., Anderson, Ind.

[73] Assignee: General Motors Corporation, Detroit, Mich.

[22] Filed: Mar. 9, 1973

[21] Appl. No.: 339,511

[52] U.S. Cl................ 240/8.16, 240/57, 248/27, 339/128, 340/381
[51] Int. Cl.............................................. B60q 3/04
[58] Field of Search............ 240/2.1, 8.16, 52, 52.1, 240/57, 151, 152; 339/50, 125, 125 L, 126, 128 X; 248/27, 223, 225; 340/381

[56] References Cited
UNITED STATES PATENTS

| | | | |
|---|---|---|---|
| 3,641,481 | 2/1972 | Farrell | 339/126 R |
| 3,511,982 | 5/1970 | Salter | 240/8.16 |
| 2,620,375 | 12/1952 | Valites | 339/126 R |
| 3,217,319 | 11/1965 | Rueger | 339/126 R X |
| 2,762,999 | 9/1956 | Huber | 240/8.16 X |
| 3,589,656 | 6/1971 | Protzmann | 248/27 |

Primary Examiner—Fred L. Braun
Assistant Examiner—Alan Mathews
Attorney, Agent, or Firm—Peter D. Sachtjen

[57] ABSTRACT

A flush mounted vehicle lamp is installed and serviced from the front of a vehicle panel. The lamp includes a lens with a peripheral flange and a base having a projecting arm. The arm and the lamp base have an insertion width less than the size of a notched opening in the panel and are rearwardly inserted therethrough in assembly. A fastener inserted through a hole adjacent the opening is threaded through the arm. Upon tightening, the fastener draws the arm against the rear panel surface thereby camming the flange against the front panel surface to fixedly mount the lamp.

2 Claims, 2 Drawing Figures

PATENTED APR 23 1974   3,806,721

FLUSH MOUNTED VEHICLE LAMP

The present invention relates to lamp assemblies and, in particular, a motor vehicle lamp assembly installed and serviced from the front of a vehicle panel.

The present invention provides a motor vehicle lamp mounting wherein the lamp is installed through an opening in a vehicle panel and mounted substantially flush with the front panel surface by means of a single fastener. The lamp base including a projecting securing arm is inserted through a notched opening in the panel. The insertion width of the arm and the base is less than the width of the notched opening. This allows complete insertion of the lamp to a rearward mounting position wherein the arm engages the rear surface of the panel. A single threaded fastener draws the securing arm against the rear panel surface and cams the lamp lens against the front panel surface to provide a flush front surface mounting of the lamp.

The above and other features of the present invention will be apparent to one skilled in the art upon reading the following detailed description, reference being made to the accompanying drawings illustrating a preferred embodiment of the present invention in which.

Figure 1:
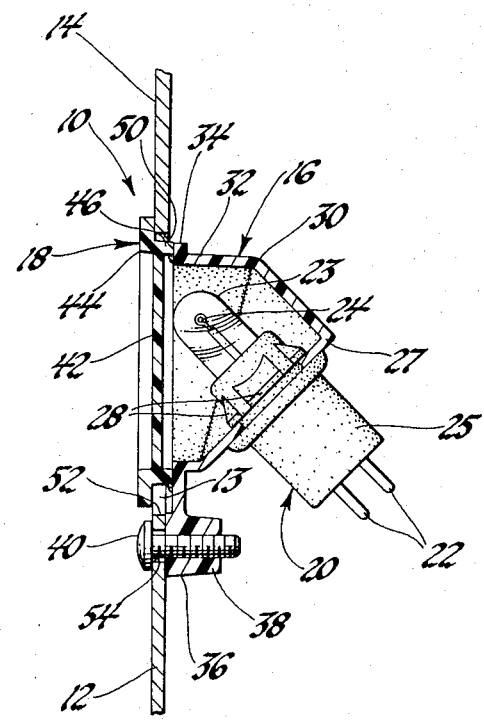
FIG. 1 shows a side cross sectional view of a flush mounted vehicle lamp made in accordance with the present invention installed on a vehicle panel.
Figure 2:
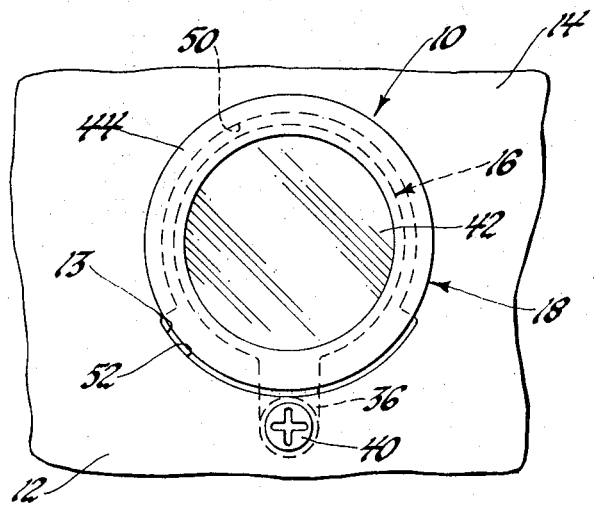
FIG. 2 is a front view of the lamp of FIG. 1 showing the disposition of the lamp and the securing arm with respect to the notched opening in the vehicle panel.

Referring to FIG. 1 there is shown a flush mounted lamp 10 installed on a motor vehicle panel 12. The panel 12 may be part of the vehicle sheet metal or ornamental trim such as the bumper. The lamp 10 is adapted for frontal insertion through a notched opening 13 for mounting substantially flush with the front surface 14 of the panel 12.

More particularly, the lamp 10 comprises a base 16, a lens 18, a light bulb and socket assembly 20 connected to an electrical source (not shown) by a pair of leads 22. The assembly 20 includes a bulb 23 having a filament 24 for projecting light outwardly through the center section of the lens 18 for the desired lighting function. The assembly 20 is provided with a twist-in socket 25 which is inserted through a suitably notched opening in a base panel 27 of the base 16. The socket 25 is rotated and a plurality of locking tabs 28 engage the front surface of the base panel 27 to fixedly mount the socket 25 on the lamp base 16. The bulb and socket assembly 20 form no part of the present invention and many other conventional structures can obviously be used to provide the desired lighting. The base 16 includes a wedge shaped annular middle section 30 and a wedge shaped front section 32. The sections 30 and 32 have their major width adjacent the top portion of the panel 12 such that the base panel 27 is inclined with respect to the panel 12. The front section 32 terminates with an annular rim 34. A radially projecting securing arm 36 extends radially downwardly from the lower surface of the rim 34. The arm 36 is provided with the threaded boss 38 adapted to receive a fastener 40.

The lens 18 includes a center optically transmissive section 42 and an outer peripheral flange 44 rearwardly terminating with an annular lip 46 suitably adhesively secured to the rim 34. The flange 44 may be chromed plated or otherwise decoratively painted. The distance between the rear surface of the flange 44 and the front surface of the securing arm 36 is substantially the same as the thickness of the panel 12.

The lamp assembly 10 is inserted through the notched opening 13 which comprises a circular main section 50 and a notched sector 52. The notched sector 52 is coaxial with the section 50 and spans approximately a 120° arc. The flange 44 has a greater diameter than the main section 50 but less than the sector 52 such that the rear surface of the flange 44 engages the front surface of the rim surrounding the notched opening for approximately 240°.

The notched opening 13 as measured through the notched sector 52 has a greater width than the minimum width across the lamp measured from any point on its front surface, below the lens 18 hereinafter designated insertion width. The arm 36 and the base 16 have a width a plane parallel to the lens 18 greater than the width of the opening 13 and the notched sector 52. This enables the base 16 and the securing arm 36 to be inserted and removed from the front of the panel. More particularly, the lamp 10 is initially cocked and the securing arm 36 and base 16 are inserted through the opening 13. The lamp 10 is rotated as the middle section 30 and front section 32 pass through the opening, the lamp always being suitably angled to present a lesser insertion width than the width of the notched opening. The lamp 10 is preliminarily aligned against the front panel surface with the flange 44 resting against the rim adjacent the opening. The lamp 10 is then circumferentially rotated until the boss 38 is aligned with the panel opening 54 for the fastener 40. The fastener 40 is then frontally inserted through the opening 54 and threaded through the boss 38 to draw the securing arm 36 against the rear panel surface. The boss 38 acts as a fulcrum which cams the lamp thereabout until the flange 46 is biased against the radially opposed front panel surface and the lamp is mounted flush with the panel 12 by means of a single fastener. For servicing, the single fastener is removed and the insertion procedure reversed.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A lamp mounting comprising: a panel member having an aperture therein including a notched portion; a lamp having a base insertable through said aperture, said lamp including a lens secured to said base, said lens having a peripheral portion overlapping the edge of said aperture; an arm projecting from said base and spaced from said lens, said base and said arm having a width in a plane parallel to the lens greater than the width of the aperture including said notched portion but having an insertion width less than the width of said aperture including said notched portion in a plane through the arm and the base thereby permitting said base and said arm to be inserted therethrough to a mounting position wherein said lens engages the front surface of said panel member and said arm engages the rear surface of said panel member; and fastener means for drawing said arm against the rear surface of said panel member to thereby fixedly mount said lamp thereon.

2. A flush mounted vehicle lamp for mounting on a vehicle panel having a notched opening including a circular section and a notched sector coaxial therewith and a fastener access hole radially outwardly of said notched sector, said lamp comprising; a circular base insertable through said opening and notched sector; a lamp bulb carried by said base adapted to be connected to an electrical source; a lens attached to said base, said lens having a circular flange with a diameter larger than said circular section and less than said notched sector; a securing arm extending radially outwardly from said base, said arm being spaced from said circular flange by the thickness of said panel, said base and said arm having a width in a plane parallel to the lens greater than the width of the circular section and the notched sector but having an insertion width measured in a plane through the arm and the base less than the width of said circular section and said notched sector to permit passage therethrough of said base and said arm to a mounting position wherein said flange engages the front surface of said panel and said arm engages the rear surface of said panel; a threaded boss in said arm registering with the access hole in said panel at mounting position; and a fastener extending through said access hole and threaded through said boss for drawing said arm against the rear surface of said panel and said flange against the front surface to thereby fixedly mount said lamp thereon.

* * * * *